April 1, 1924.

E. PANZA

FENDER

Filed Nov. 28, 1923

1,488,551

INVENTOR.
Eugene Panza.
BY
Harry W. Bown.
ATTORNEY.

Patented Apr. 1, 1924.

1,488,551

UNITED STATES PATENT OFFICE.

EUGENE PANZA, OF SPRINGFIELD, MASSACHUSETTS.

FENDER.

Application filed November 28, 1923. Serial No. 677,381.

*To all whom it may concern:*

Be it known that I, EUGENE PANZA, at present a subject of the King of Italy, but I have declared my intention of becoming a citizen of the United States, residing at Springfield, in the county of Hampden and State of Massachusetts, have invented new and useful Improvements in Fenders, of which the following is a specification.

This invention relates to improvements in fenders and more particularly it relates to fenders for use on motor vehicles, for preventing the vehicle, from injuring a person in the event he should be struck, and, in order to avoid seriously injuring the person the fender is so designed and constructed as to be quickly moved downward close to the roadway and operate as a device to pick up the person. When not in use it will automatically return to its normally upward or closed position. Broadly, it comprises a pair of bracket members that are designed for attachment to the forward ends of the chassis, and a plurality of transversely located bars which may be moved into closed positions near to each other for forming a bumper when the fender feature is not in use. A construction which is connected to the brake pedal is employed for moving the bars downward in case it is necessary to use the device as a fender. Springs are employed for automatically returning the bars to their normally elevated or closed position when they are to operate as a bumper. The invention further comprises means for protecting the sides of the wheels from coming into contact with the curbing should the vehicle be driven too close to the same.

Referring to the drawings.

Figure 1:
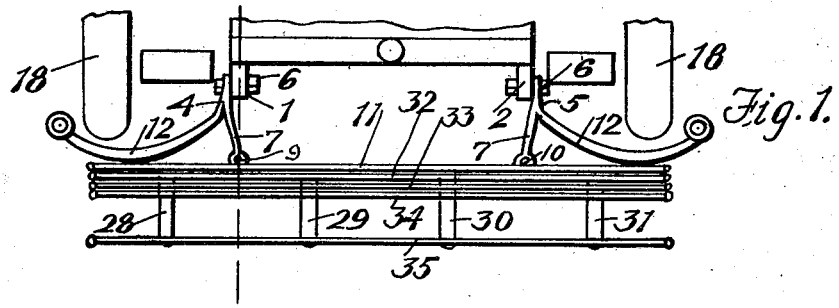
Fig. 1 is a plan view of the fender in its open position.
Figures 2, 3:
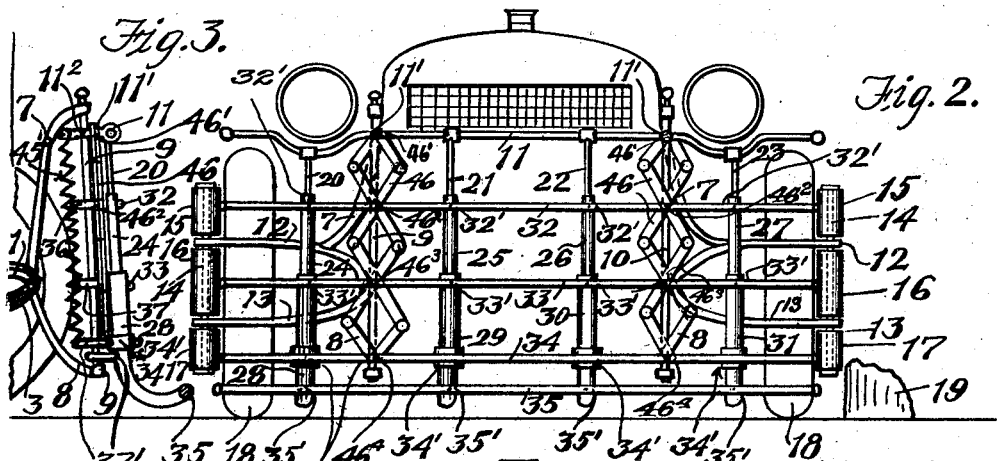
Fig. 2 is a front elevational view showing the fender in its extended or lowered position and illustrating the plurality of transversely extending bars and the bracket members for attaching the device to the chassis or frame, also the roller device for preventing the sides of the wheels from engaging the curbing.
Fig. 3 is a side elevational view of Fig. 2 showing the curved lower ends of the vertically arranged rods for supporting the two lowermost bars.
Figure 4:
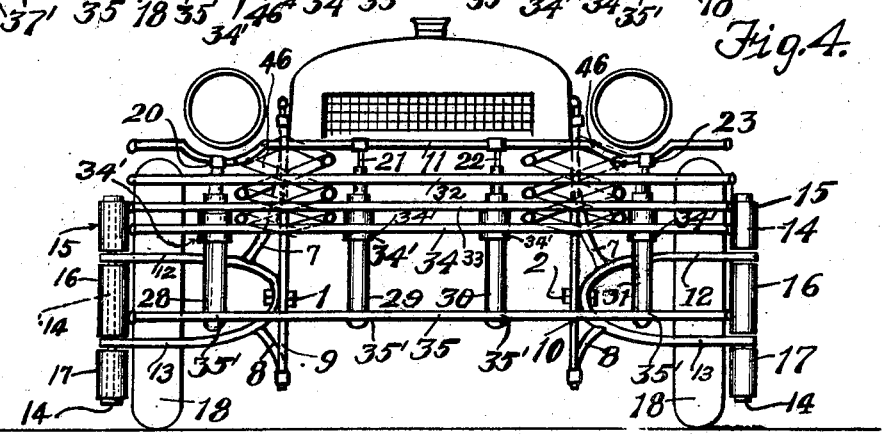
Fig. 4 is a front elevational view showing the device in its normally closed or collapsed position, and, Fig. 5 is a detail view of the connecting mechanism for raising and lowering the fender from the brake pedal.
Figure 5:
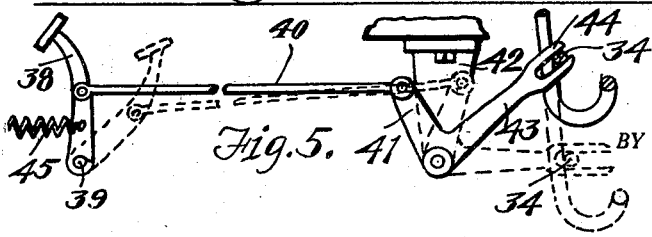

Referring to the drawings in detail:

1 and 2 designate the forward end portions of the chassis to which the springs 3 are connected. Attached to these forward end portions are the brackets 4 and 5 by means of the bolts, indicated at 6. These brackets are formed with the integral oppositely extending upper and lower arms 7 and 8 shown in Figs. 3 and 4. Attached to the upper and lower ends of the arms 7 and 8 are the vertically arranged rods 9 and 10. Attached to the rods 9 and 10 is the upper transversely arranged rod 11, by means of the brackets 11' and pins 11². Extending laterally of the arms 7 and 8 are the outwardly extending arms 12 and 13. Connected to the outer ends of the arms 12 and 13 are the vertically arranged rods 14, and on these rods are located the rotatable sleeves 15, 16, and 17. The purpose of these sleeves is to protect the outer sides of the forward wheels, indicated at 18, should the vehicle be driven against the side of the curbing, or other obstruction as indicated at 19, whereby these sleeves will be rotated and thus prevent the tire from being injured or damaged. Attached to the bar 11 are the depending rods 20, 21, 22, and 23, which slide into the corresponding number of tubular members 24, 25, 26, and 27 and these tubular members in turn, slide or telescope into the corresponding number of tubular members 28, 29, 30, and 31. The rod members 24 to 27 are connected together by means of the rod 32 as indicated at 32' and the members 28 to 31 are connected together by means of the rods 33, 34 and 35. The rods 33 and 35 are pinned to the sleeve members 28 to 31 as indicated at 33' and 35' while the rod 34 slides on the sleeve members 28 to 31 by means of the rings 34' as shown. The lazy tongs 46 are slidably mounted on the vertical rods 9 and 10 by means of the eye bolts 36 and 37 and 37', whereby the bars 32, 33, and 35 may be moved upwards into the position shown in Fig. 4 to form a bumper. The parts of the structure are in their normal or lower extended position when it is desired to use the device as a fender. The bar 34 is drawn upward by means of the lazy tongs. In order to normally retain the bars in their upward position the spring mechanism shown in Figs. 3 and 5 is employed which includes the usual brake pedal member 38 that is pivotally connected to a support indicated by the pivot 39. Connected to the brake pedal is the link 40 and its opposite end is connected to the bell-crank lever 41 that is attached to the bracket 42. The other arm 43 of the bell-crank lever is attached to the bar 34 by means of the fork 44. It will be seen that when the brake pedal 38 is moved forward into the dotted line position that the bars 33, 34, and 35 are moved downward into the open position as shown in Figs. 2 and 3 and when the operator releases his pressure on the pedal 38 the springs 45 and 45' will return the bars to their upward or closed position as shown in Fig. 4. Attached to the bars 11, 32, 33 and 34 are the lazy tongs or links 46 as indicated by the pivot pins 46', 46², 46³, and 46⁴, for the purpose of closing or drawing these bars upward into a closed position to form a bumper and spacing these bars in parallel relation to each other during the opening and closing movements of the fender. The important feature of the device is that the bracket arms 12 and 13 extend outward far enough to protect the wheels 18 when the car is turned or directed around a corner or curve. This is shown in the plan view of Fig. 1.

The lazy tongs 46 are connected at their upper ends to the brackets 11' and at their lower ends to the rings 34' which slide on the tubular members 28, 29, 30, and 31 and to which the bar 34 is connected. It will therefore be seen that when the operator pushes forward on the brake pedal 38 the springs 45 and 45' will be extended. At the same time the bars 32, 33, and 34 will be moved downward into their open or spaced positions as shown in Fig. 2 since the fork 44 engages the bar 34 which pulls the tubular members 28, 29, 30, and 31 downward, these tubular members pull the bars 33 which are pinned thereto as indicated at 33' and since the lazy tongs are connected to the bars 33 they will move the bar 34 downward on the tubular members 28 to 31. The bar 32 and tubular members 20 to 23 will also be drawn downward. When the operator releases his pressure on the brake pedal the springs 45 and 45' will through the action of the lazy tongs draw the bars 32, 33, 34, and 35 upward into their closed positions as shown in Fig. 4.

What I claim is:

1. A device for the purpose described, comprising bracket members designed to be attached to the forward end of the vehicle chassis, vertically arranged rods attached to the bracket members, a transversely located rod attached to the vertical rods, telescoping members attached to the transversely located rod, and means for normally maintaining the rods in a closed position to serve as a bumper, and means for moving the bars downward into spaced or opened positions to serve as a fender.

2. In a combined fender and bumper device, the combination of bracket arms designed to be attached to the chassis, said brackets having oppositely extending arms, vertically arranged rods attached to the oppositely extending arms, a plurality of bars slidably mounted on the vertical rods, means for moving the bars slidably mounted on the vertical rods, means for moving the bars downward relative to each other, and means to automatically return the bars into their normal or closely spaced relation.

3. In a combined fender and bumper device, the combination of bracket arms designed to be attached to the chassis, said brackets having oppositely extending arms, vertically arranged rods attached to the oppositely extending arms, a plurality of bars slidably mounted on the vertical rods, means for moving the bars downward relative to each other, and means to automatically return the bars to their normal or closely spaced relation, said brackets having outwardly extending arm portions connected thereto and terminating beyond the outer sides of the forward wheels, a roller device mounted on the outer ends of the arms, said roller device being arranged in a vertical plane.

4. In a device for the purpose described, the combination of means for attaching the device to the chassis portion of the vehicle, a plurality of vertically arranged telescoping members, a plurality of transversely located bars attached to the telescoping members, means for retaining the bars and telescoping members in a normally closed position, means for extending the members and bars to serve as a fender comprising a pedal device, connecting means between the pedal and the bars, and springs for normally retaining the bars and members in their normally closed position to serve as a bumper.

5. A fender device comprising bracket members, rods attached to the bracket members, telescoping members, means for slidably mounting the telescoping members on the rods, a plurality of transversely arranged bars connected to the telescoping members, the lowermost telescoping members each being formed with a curve, a bar being attached to their outer ends, means for slidably mounting the bars on the vertically arranged rods the lazy tongs construction attached to the transversely arranged bars.

6. A fender for motor vehicles comprising in combination, bracket members designed for attachment to the chassis of the vehicle, and formed with outwardly extending arms, a rod attached to each of the arms, rotatable sleeves on such of the rods to protect the outer sides of the front steering wheels from coming into contact with the curbing or other obstruction, a vertically arranged rod secured to the brackets, telescoping sleeve members secured to the rods, bars attached to the sleeve members, lazy tongs connected to the bars, and springs for normally retaining the bars in relation at or near the center of the fender.

7. A fender and bumper construction comprising in combination with the chassis of a motor vehicle, brackets formed with upwardly and downwardly extending arms, a vertically arranged rod secured in each of the arms, a transversely located bar attached to the rod, depending telescoping members attached to the bar, and slidable on the vertical rods, other bars attached to the telescoping members, lazy tongs attached to the said other bars, springs for normally maintaining the other bars in closed position to serve as a fender and means for spacing the bars and extending the telescoping members when they serve as a fender.

EUGENE PANZA.